United States Patent
Tsuchiya et al.

(10) Patent No.: US 7,947,624 B2
(45) Date of Patent: May 24, 2011

(54) METAL HONEYCOMB-SHAPED CATALYZER CARRIER

(75) Inventors: Takashi Tsuchiya, Tochigi (JP);
Tadashi Goto, Tochigi (JP); Nobuyuki Kakiya, Tochigi (JP); Chiyoko Nemoto, Tochigi (JP); Toshiyuki Horimukai, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 692 days.

(21) Appl. No.: 11/993,160

(22) PCT Filed: Jun. 9, 2006

(86) PCT No.: PCT/JP2006/311633
§ 371 (c)(1),
(2), (4) Date: Dec. 19, 2007

(87) PCT Pub. No.: WO2006/137276
PCT Pub. Date: Dec. 28, 2006

(65) Prior Publication Data
US 2010/0222216 A1 Sep. 2, 2010

(30) Foreign Application Priority Data
Jun. 21, 2005 (JP) .................................. 2005-181242

(51) Int. Cl.
*B01J 21/04* (2006.01)
*B01J 23/02* (2006.01)
*B01D 50/00* (2006.01)
*B01D 53/34* (2006.01)
*B32B 3/12* (2006.01)
*B21D 39/00* (2006.01)

(52) U.S. Cl. ........ 502/439; 422/180; 422/181; 428/116; 428/593

(58) Field of Classification Search .................. 502/439; 422/180, 181; 428/116, 593
See application file for complete search history.

(56) References Cited

U.S. PATENT DOCUMENTS

| | | | | |
|---|---|---|---|---|
| 3,811,130 | A * | 5/1974 | Townsend, Jr. ............... | 2/175.1 |
| 4,521,947 | A * | 6/1985 | Nonnenmann et al. ......... | 29/890 |
| 4,849,274 | A * | 7/1989 | Cornelison ................... | 428/116 |
| 5,084,361 | A * | 1/1992 | Toyoda et al. ................ | 428/593 |
| 5,302,355 | A * | 4/1994 | Fujikura et al. .............. | 422/180 |
| 5,435,958 | A * | 7/1995 | Dinnage et al. ............. | 264/171.1 |

(Continued)

FOREIGN PATENT DOCUMENTS

| | | |
|---|---|---|
| JP | 3193335 | 8/1991 |
| JP | 03193335 A * | 8/1991 |

(Continued)

*Primary Examiner* — Stanley Silverman
*Assistant Examiner* — Anthony J Zimmer
(74) *Attorney, Agent, or Firm* — Rankin, Hill & Clark LLP

(57) ABSTRACT

In a metal honeycomb-shaped catalyzer carrier 11, a corrugated portion 24 is formed on one side 33 in the longitudinal direction of a metallic thin belt plate 23. A plurality of belt plates 23, . . . are alternately stacked such that a flat plate portion 35 on the other side 34 of another belt plate 23 is superimposed on the corrugated portion 24, and are wound from their central flat portion 25 in the longitudinal direction thereby to form a wound honeycomb-shaped carrier body 12. The wound honeycomb carrier body 12 is fit in a hollow cylindrical member 13. The central flat portion 25 of the belt plate is wound so as to form a central cylindrical portion 17 having diameter of D, and length of the central flat portion in the longitudinal is at least 4.14 D.

4 Claims, 5 Drawing Sheets

U.S. PATENT DOCUMENTS

| | | | |
|---|---|---|---|
| 5,582,803 A * | 12/1996 | Yoshizaki et al. | 422/174 |
| 5,618,498 A * | 4/1997 | Konya et al. | 422/174 |
| 5,618,501 A * | 4/1997 | Wieres et al. | 422/180 |
| 5,670,001 A * | 9/1997 | Huebner et al. | 156/197 |
| 5,729,902 A * | 3/1998 | Wieres et al. | 29/890 |
| 5,894,013 A * | 4/1999 | Takada | 422/177 |

FOREIGN PATENT DOCUMENTS

| | | |
|---|---|---|
| JP | 5-070644 | 9/1993 |
| JP | 5-70644 | 9/1993 |
| JP | 7-116758 | 5/1995 |
| JP | 2811486 | 8/1998 |
| JP | 11-253814 | 9/1999 |

\* cited by examiner

METAL HONEYCOMB-SHAPED CATALYZER CARRIER

FIELD OF THE INVENTION

This invention relates to a cylindrical metal honeycomb-shaped catalyzer carrier for carrying the catalyzer used for cleaning an exhaust gas exhausted from an internal combustion engine.

BACKGROUND ART

There is known a metal honeycomb-shaped catalyzer carrier, in which members each having a corrugated area formed on one side of a metallic belt plate except its central area and the other portion remaining a flat plate shape are alternately stacked so that the corrugated area of this member and the plate portion of another member are in contact with each other, and these members are wound around their centers to form a cylindrical honeycomb body covered with an external hollow cylindrical member (for example, see Japanese Patent Unexamined Publication No. JP-A-7-116758).
Patent Literature Japanese Patent Unexamined Publication JP-A-7-116758 (pages 4-5, FIGS. 1 and 3)
Referring to the following drawing, the JP-A-7-116758 will be explained.
FIGS. 6A to 6C are views for explaining the JP-A-7-116758. A heat-resistant structure 113, which made by a method for manufacturing a conventional heat resistant structure, is obtained by covering wound matrixes 101 with an external cylinder 108. Concretely, the matrix 101 is a flat plate 102 having a corrugated plate 103 formed on the one side thereof. In stacking a plurality of matrixes 101, a predetermined number of matrixes 101 are alternately stacked so that the corrugated plate 103 and the flat plate 102 of another matrix 101 are in contact with each other. A central area 104 of each the matrixes 101 is pressed to form a parallel portion 105. The parallel portion 105 is sandwiched by stopper members 106. The matrixes are wound around the parallel portion 105, thereby making a honeycomb body 107. The honeycomb body 107 is covered with an external hollow cylindrical member 108. Both ends of the external hollow cylindrical member 108 are welded with stopper rings 109 in a state where clearance t are formed between themselves and both ends of the honeycomb body 107. The end 111 of the external hollow cylindrical member 108 is welded with the other side 112 of the stopper member 106.

As described above, since the heat resistant structure 113 disclosed in JP-A-7-116758 is manufactured without using a brazing material, thermal stress due to expansion/shrinkage is not generated.

However, the heat resistant structure 113 disclosed in JP-A-7-116758 has the clearance t formed between both ends of the honeycomb body 107 and the stopper rings 109, respectively. Therefore, if this heat resistant structure is employed for a motor car or an motorcycle, for example, owing to the vibration during running, the honeycomb body 107 moves to vibrate with the external cylindrical material 108 so that it may be broken.

Further, in the heat resistant structure disclosed in JP-A-7-116758, the other side 112 of the stopper member 106 must be welded onto the end 111 of the external hollow cylindrical member 108 so that the stopper member 106 obstructs the flow of the exhaust gas. Particularly, the other side 112 seals the end 111 so that it interferes with the exhaust gas flowing through the honeycomb body 107 and so serves as resistance against the flow of the exhaust gas.

Further, when the matrixes are wound around the parallel portion 105 to form the honeycomb 107, the corrugated plates 103 communicating with the parallel portion 105 may be collapsed.

DISCLOSURE OF THE INVENTION

Problem to be Solved by the Invention

An object of this invention is to provide a metal honeycomb-shaped catalyzer carrier which gives no fear of breakage of a honeycomb portion due to thermal stress and can reduce the collapsing degree of corrugated areas communicating with central areas even when the central areas are wound by one or more turns to form a central cylindrical portion without using a stopper member.

Means to Solve the Problem

According to an aspect of the present invention, there is provided a metal honeycomb-shaped catalyzer carrier, comprising:
a wound honeycomb body comprising a plurality of belt plate which extend in a longitudinal direction and which are provided with:
   a corrugated portion on one side of the plate belt in the longitudinal direction;
   an end flat portion on the other side of the belt plate in the longitudinal direction; and
   a central flat portion on an intermediate position of the belt plate in the longitudinal direction; and
a hollow cylindrical member accommodating the wound honeycomb body therein;
wherein the plurality of the belt plates are superimposed each other in such a manner that the corrugated portion of one of the belt plate overlaps with the flat portion of the other belt plate, and are wounded together from the central flat portion, to thereby form the wound honeycomb body,
wherein the central flat portion of the belt plate is wound so as to form a central cylindrical portion having diameter of D, and
wherein length of the central flat portion in the longitudinal is at least 4.14 D.

Advantages of the Invention

In the invention described in the first aspect of the invention, where the diameter of the central cylindrical portion of the wound honeycomb carrier fit in the hollow cylindrical member is set at D, the length Lm of the central area is set at least 4.14 D. Namely, since the length of the central area is set at the sum of the circumference of the central cylindrical portion and the diameter of the central cylindrical portion, the collapsing degree of the corrugate areas can be made small even when the central cylindrical portion is formed by winding the central areas by one or more turns.

DESCRIPTION OF REFERENCE NUMERALS AND CHARACTERS

Figure 1:
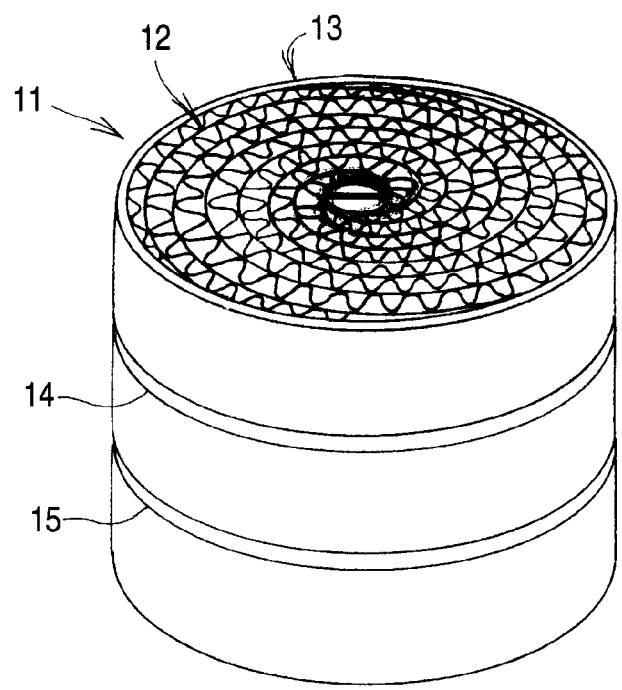
FIG. 1 is a perspective view of a metal honeycomb-shaped catalyzer carrier according to this invention.

11: metal honeycomb catalyzer carrier;
12: wound honeycomb body;
13: tubular member;
16: central area of wound honeycomb body;
17: central cylindrical portion
18: honeycomb portion
23: belt plate
24: corrugated portion
25: central flat portion
31: belt plate
33: one side of the belt plate
34: other side of the belt plate
35: flat plate portion
Lm: longitudinal length of central flat portion

DETAILED DESCRIPTION OF THE PREFERRED EMBODIMENTS

Now referring to the attached drawings, an explanation will be given of the best mode for carrying out the invention. It is assumed that the drawings are seen in the direction of reference symbols.

FIG. 1 is a perspective view of the metal honeycomb-shaped catalyzer carrier according to the invention.

A metal honeycomb-shaped catalyzer carrier 11 includes a wound honeycomb carrier body 12, a hollow cylindrical member 13 covering the wound honeycomb carrier body 12 and welding portions 14, 15 for fixing the wound honeycomb carrier body 12 to the hollow cylindrical member 13.

Figure 2:
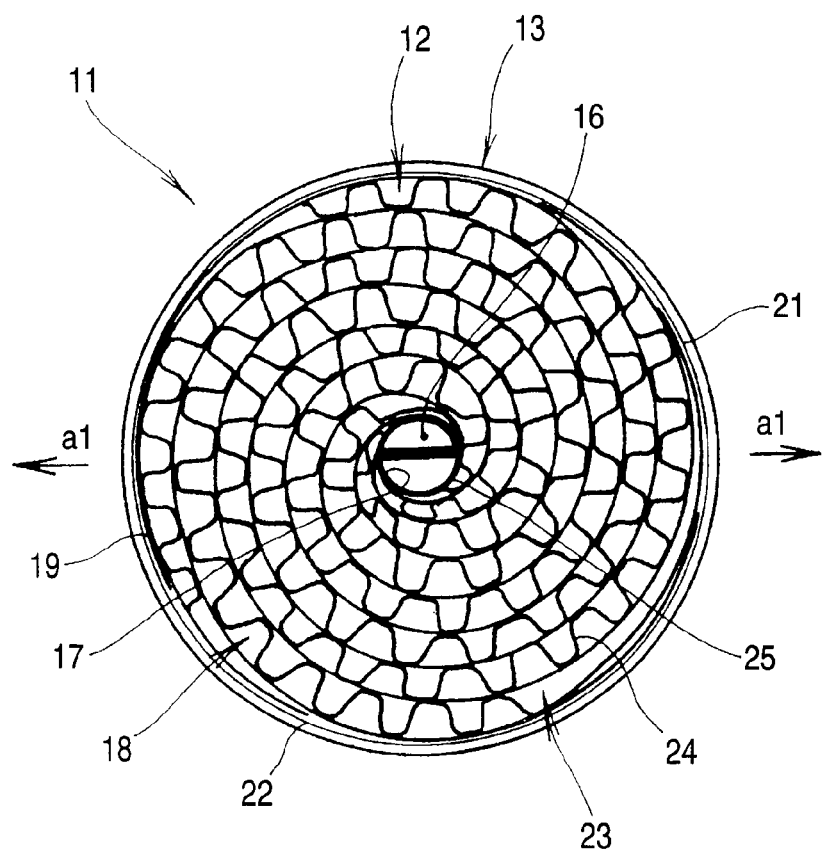
FIG. 2 is a plan view of a metal honeycomb-shaped catalyzer carrier according to this invention.

FIG. 2 is a plan view of the metal honeycomb-shaped catalyzer carrier according to the invention. Referring to FIG. 2 as well as FIG. 1, the wound honeycomb carrier body 12 has a honeycomb shape in section. The wound honeycomb carrier body 12 includes a central cylindrical portion 17 formed in a central area 16, a honeycomb portion 18 radially outward (direction of arrows a1, a1) communicating with the central cylindrical portion 17, and winding ends 19 (see FIG. 3), 21 (see FIG. 3 also) outward communicating with the honeycomb portion 18. The winding ends 19, 21 are integrally fixed to the inner surface 22 (see FIG. 5) of the hollow cylindrical member 13 by the welding portions 14, 15. Reference numeral 23 denotes a belt plate; 24 denotes a corrugated area of the belt plate 23 (see FIGS. 3) and 25 denotes a central area of the belt plate 23.

The central cylindrical portion 17 designates a cylindrical area of a central flat portion 25 a cylinder which is formed in such a manner that four stacked belt plates 23 are superimposed and wound. The thickness of the central cylindrical portion 17 is at least equivalent to the thickness that is obtained when at least four belt plates 23 are stacked. The diameter D of the central cylindrical portion 17 designates the diameter at the center of the thickness of the central cylindrical portion 17. Since the central cylindrical portion 17 is not a perfect circle and deviation is generated when winding the belt plates 23, the diameter D is defined an average diameter of figure, which is illustrated by central line of thickness of the central cylindrical portion 17.

Figure 3:
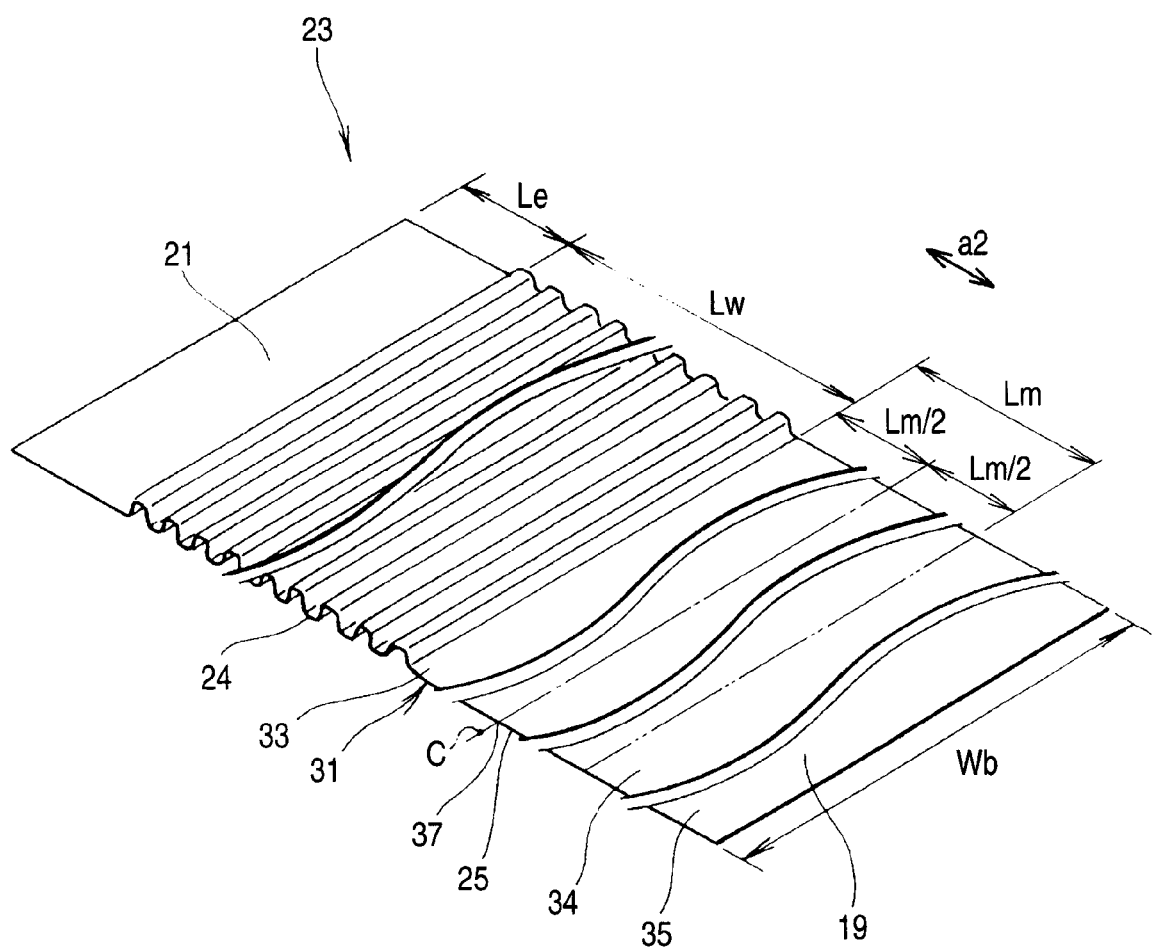
FIG. 3 is a perspective view of a belt plate employed for the metal honeycomb-shaped catalyzer carrier according to this invention.

FIG. 3 is a perspective view of a belt plate employed for the metal honeycomb-shaped catalyzer carrier according to this invention. Referring to FIG. 3 as well as FIG. 2, the belt plate will be explained.

The belt plate 23 is constituted as follows. On the one side 33 of a belt plate 23 with respect to a central flat portion 25 of a belt plate 31, a corrugated portion 24 is formed. Continuing to the corrugated portion 24, an area having a desired length Le is caused to remain flat. The area remaining flat by the length of Le has a winding end 21. The other side 34 of the belt plate 23 is caused to remain flat to form a flat plate portion 35 having another winding end 19. Further, the central flat portion 25 is formed so as to remain flat at longitudinal central area. Reference numeral 37 denotes a center position in the longitudinal (direction of arrow a2) of the belt plate 23; C denotes a central line for the longitudinal direction of the belt plate 23; and Wb denotes the width of the belt plate 23.

The winding end 19 is also the end on the other side 34 of the belt plate 23.

The winding end 21 is also the end on the one side 33 of the belt plate 23.

The central flat portion 25 is an area remaining flat within a range of at least length of Lm.

The length Lm of the central flat portion 25 is at least the sum of the circumference of the central cylindrical portion 17 and the diameter of the central cylindrical portion 17. Namely, $Lm=\pi D+D=D(\pi+1)=4.14\,D$. Further, length Lm consists of a length Lm/2 set on the one side 33 with respect to the center position 37 (center line C) of the belt plate 23 and length Lm/2 on the other side 34 with respect to the center position 37 (center line C).

The length Lm of the central flat portion 25 is concretely set within a range of 4.14 to $2\pi D$.

If the length Lm of the central flat portion 25 is less than 4.14 D, when the central flat portion 25 is wound to form the central cylindrical portion 17, the collapsing degree of the corrugated portion 24 is increased.

If the length Lm of the central flat portion 25 exceeds $2\pi D$, the length Lw of the corrugated portion 24 is shortened so that the area of the honeycomb portion 18 is reduced.

Next, an explanation will be given of the operation of the metal honeycomb-shaped catalyzer carrier according to this invention.

Figure 4A:
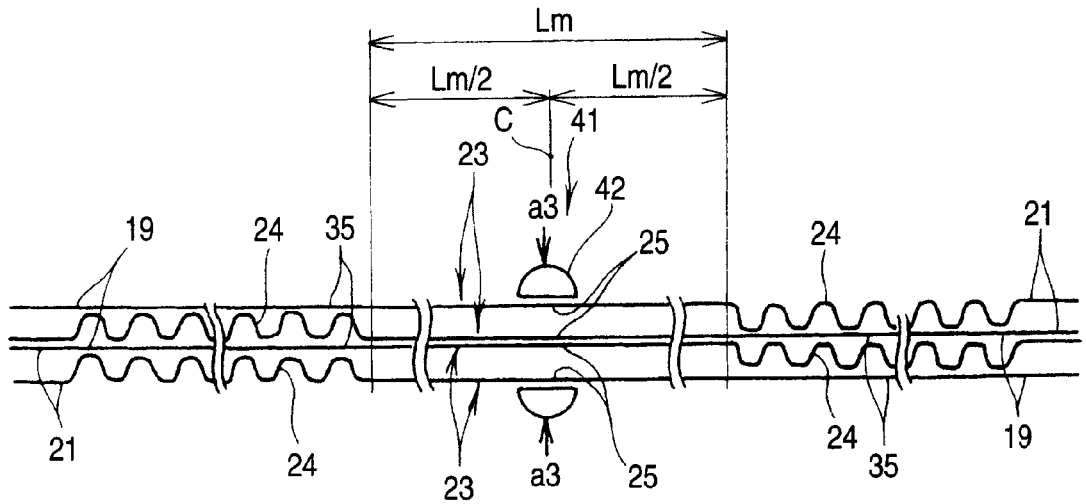
FIG. 4A is a view for explaining the operation of a metal honeycomb-shaped catalyzer carrier according to this invention.
Figure 4B:
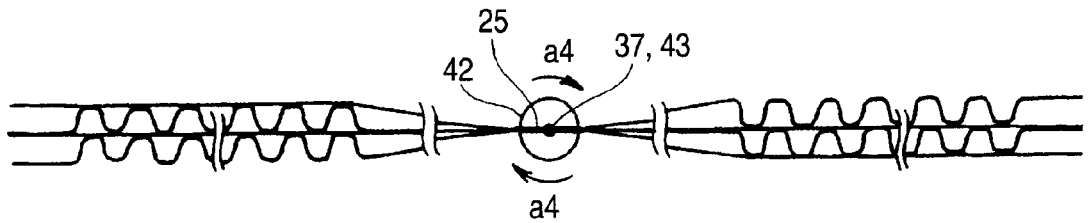
FIG. 4B is a view for explaining the operation of a metal honeycomb-shaped catalyzer carrier according to this invention.
Figure 4C:
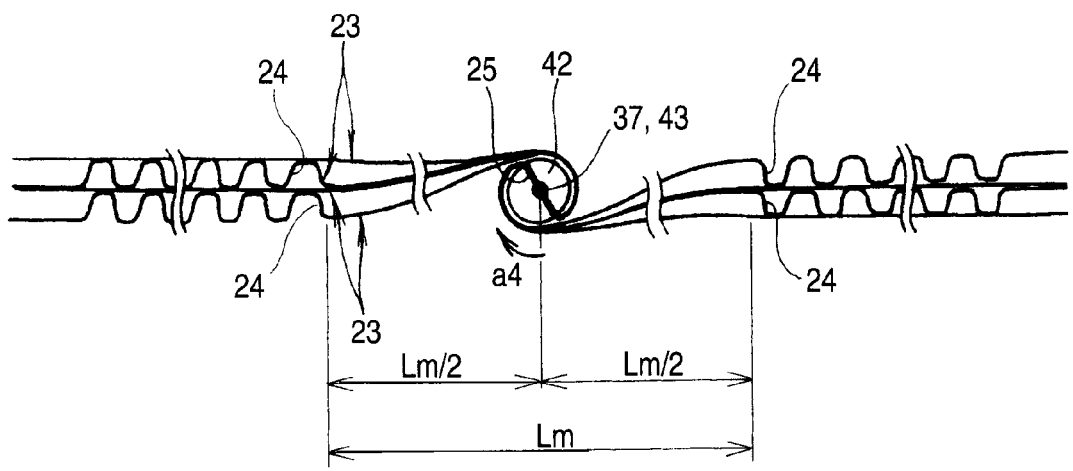
FIG. 4C is a view for explaining the operation of a metal honeycomb-shaped catalyzer carrier according to this invention.

FIGS. 4P to 4C are views for explaining the operation of the metal honeycomb-shaped catalyzer carrier according to this invention.

In FIG. 4A, the corrugated portion 24 is formed on each of the belt plates 31 by rotating e.g. a forming roll (not shown). Four belt plates 23 . . . ( . . . denotes plurality, and this applies to the following description) are taken out and set in a holding member 42 of a winding device 41. In this case, the belt plates 23 are alternately stacked so that the corrugated portion 24 of the belt plate 23 superimposes the flat plate portion 35 of another belt plate 23. Thereafter, the central flat portions 25, are held by the holding member 42 in a direction of arrow a3 so that the corrugated portion 24 will not be collapsed.

In FIG. 4B, after the central flat portion 25, . . . have been held, the holding member 42 is rotated in directions of arrows a4, a4 around a rotary central axis 43 of the center position 37 included in the central flat portion 25.

In FIG. 4C, where, the central flat portion 25 are wound around the rotary central axis 43 of the center position 37 by one or more turns (in the direction of arrow a4) to form the central cylindrical portion 17 (see FIG. 1), since the length Lm of the central flat portion 25 is set at the sum of the circumference of the central cylindrical portion 17 and the diameter of the central cylindrical portion 17, the amount of collapsing of the corrugate areas 24 can be made small when the central cylindrical portion 17 is formed.

As described above, in the metal honeycomb-shaped catalyzer carrier 11, the corrugated portion 24 is formed on the one side 33 in the longitudinal direction (in the direction of the arrow a2) of a metallic thin belt plate 23, and the plurality of belt plates 23, . . . are alternately stacked such that the flat plate portion 35 on the other side 34 of another belt plate 23 is superimposed on the corrugated portion 24 and are wound from the central flat portion 25 in the longitudinal direction thereby to form the wound honeycomb carrier body 12 having a honeycomb shape in section. The wound honeycomb carrier body 12 is fit in the hollow cylindrical member 13. In this case, where the diameter of the central cylindrical portion 17 of the wound honeycomb carrier body 12 fit in the hollow cylindrical member 13 is set at D, since the length in the longitudinal direction of the central flat portion 25 is set at least 4.14 D, even when the central flat portion 25 are wound by one or more turns to form the central cylindrical portion 17, the amount of collapsing of the corrugated portion 24 communicating with the central flat portion 25 can be made small.

Figure 5:
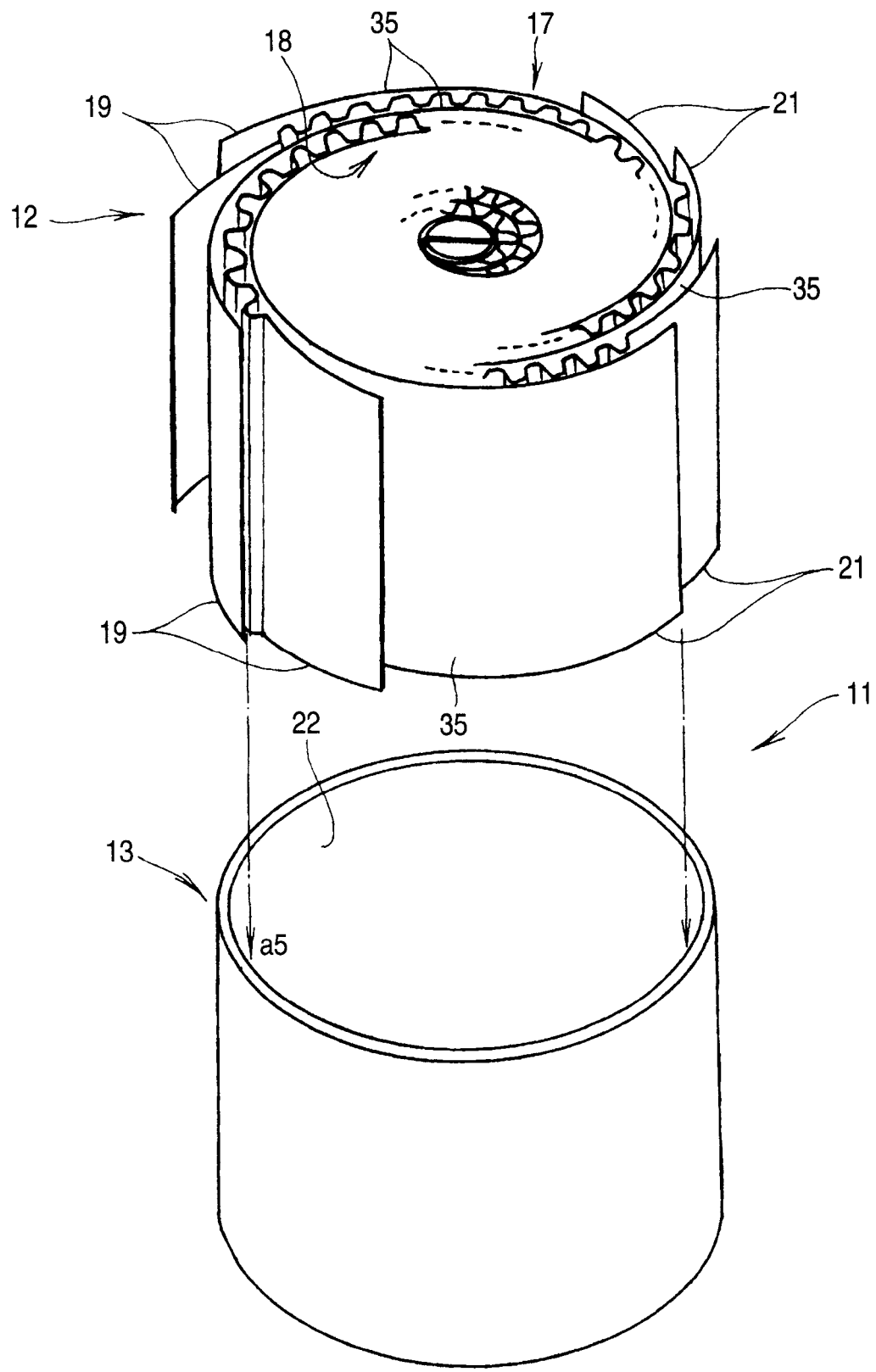
FIG. 5 is a view for explaining state when the wound honeycomb carrier of the metal honeycomb-shaped catalyzer carrier according to this invention is fit in a hollow cylindrical member.
Figure 6A:
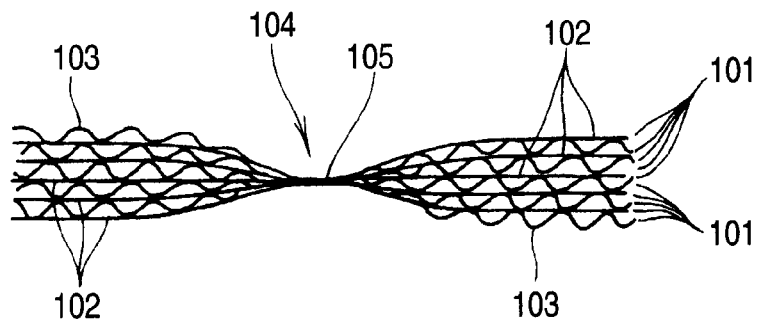
FIG. 6A is a view for explaining a conventional example.
Figure 6B:
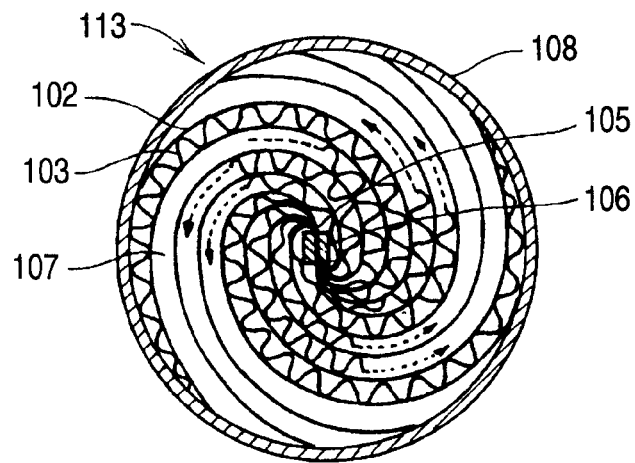
FIG. 6B is a view for explaining a conventional example.
Figure 6C:
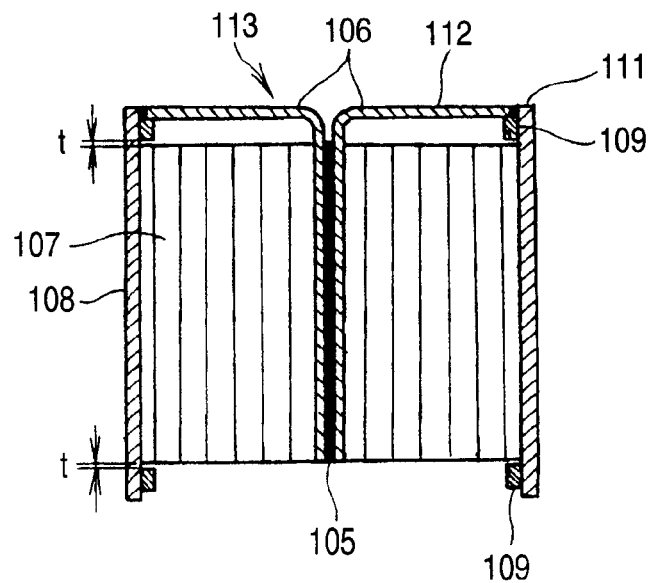
FIG. 6C is a view for explaining a conventional example.

FIG. 5 is a view for explaining state when the wound honeycomb carrier of the metal honeycomb-shaped catalyzer carrier according to this invention is fit in the hollow cylindrical member.

By further winding, the honeycomb portion 18 is formed, and on completion of winding, the wound honeycomb carrier body 12 having a honeycomb shape in section is formed.

Finally, after the wound honeycomb carrier body 12 has been fit in the hollow cylindrical member 13 in the direction of arrow a5, the winding ends 19, . . . 21, . . . of the would honeycomb carrier 12 are fixed on the inner surface of the hollow cylindrical member 13.

In the embodiment described above, the metal honeycomb-shaped catalyzer carrier according to this invention has been applied to the honeycomb structure for holding the catalyzer, but can be applied to the honeycomb structure in the use other than holding the catalyzer.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

This application is based on Japanese Patent (P.2005-181242) filed on Jun. 21, 2005, and the contents thereof are incorporated herewith as a reference.

INDUSTRIAL APPLICABILITY

The metal honeycomb-shaped catalyzer carrier according to this invention is preferably applied to the honeycomb catalyzer carrier for carrying the catalyzer used for cleaning an exhaust gas.

The invention claimed is:

1. A metal honeycomb-shaped catalyzer carrier, comprising:
   a wound honeycomb body comprising a plurality of belt plates that extend in a longitudinal direction, each of said belt plates comprising:
      a corrugated portion on a first longitudinal end;
      an end flat portion on a second longitudinal end; and
      a central flat portion longitudinally disposed between the corrugated portion and the end flat portion; and
   a hollow cylindrical member accommodating the wound honeycomb body therein;
   wherein the plurality of the belt plates are superimposed on each other such that the corrugated portion of one of the belt plates overlaps with the end flat portion of an adjacent belt plate, and the plurality of superimposed belt plates are wound together from the central flat portions of each of the belt plates to form the wound honeycomb body,
   wherein the central flat portions of the superimposed belt plates are wound together to form a central cylindrical portion of the wound honeycomb body having a diameter of D, and
   wherein a length of the central flat portion of each of the belt plates in the longitudinal direction is at least 4.14 D.

2. The metal honeycomb-shaped catalyzer carrier of claim 1, further comprising:
   a flat winding end that forms a terminal end of the corrugated portion such that the corrugated portion is longitudinally disposed between the flat winding end and the central flat portion.

3. The metal honeycomb-shaped catalyzer carrier of claim 1,
   wherein in each of the belt plates, a distance from the corrugated portion to a center of the central flat portion in the longitudinal direction is a half of the length of the central flat portion, and the plurality of belt plates are superimposed on each other such that the center of the central flat portion of the one of the belt plates and the center of the central flat portion of the adjacent belt plate are aligned in the longitudinal direction.

4. The metal honeycomb-shaped catalyzer carrier of claim 1, wherein the plurality of belt plates are superimposed on each other such that the corrugated portion of the one of the belt plates protrudes from the central flat portion in a first direction, and the corrugated portion of the adjacent belt plate protrudes from the central flat portion in a second direction that is opposite the first direction.

\* \* \* \* \*